(12) United States Patent
Chang (10) Patent No.: US 11,983,044 B2
(45) Date of Patent: May 14, 2024

(54) MOBILE ELECTRONIC DEVICE AND EXPANSION UNIT

(71) Applicant: GETAC HOLDINGS CORPORATION, Taoyuan (TW)

(72) Inventor: Kuang-Yeh Chang, Taipei (TW)

(73) Assignee: Getac Holdings Corporation, Taoyuan (TW)

( * ) Notice: Subject to any disclaimer, the term of this patent is extended or adjusted under 35 U.S.C. 154(b) by 0 days.

(21) Appl. No.: 17/943,085

(22) Filed: Sep. 12, 2022

(65) Prior Publication Data

US 2023/0004194 A1 Jan. 5, 2023

Related U.S. Application Data

(63) Continuation-in-part of application No. 16/995,009, filed on Aug. 17, 2020, now Pat. No. 11,537,169, and a continuation-in-part of application No. 16/890,955, filed on Jun. 2, 2020, now Pat. No. 11,442,507.

(51) Int. Cl.
*G06F 1/16* (2006.01)

(52) U.S. Cl.
CPC .......... *G06F 1/1656* (2013.01); *G06F 1/1684* (2013.01)

(58) Field of Classification Search
CPC ...... G06F 1/1656; G06F 1/1658; G06F 1/166; G06F 1/1684
See application file for complete search history.

(56) References Cited

U.S. PATENT DOCUMENTS

| 9,317,077 | B2 * | 4/2016 | Mori | G06F 1/1616 |
| 9,960,521 | B2 * | 5/2018 | Armstrong | H01R 13/516 |
| 10,827,809 | B2 * | 11/2020 | Skahan | A45C 11/00 |
| 11,442,507 | B2 * | 9/2022 | Chang | G06F 1/1656 |
| 11,537,169 | B2 * | 12/2022 | Chang | G06F 1/183 |
| 2009/0219676 | A1 * | 9/2009 | Murakata | H01M 50/262 361/679.01 |
| 2012/0099266 | A1 * | 4/2012 | Reber | G06F 1/182 361/679.26 |
| 2014/0368994 | A1 * | 12/2014 | Lee | H05K 5/061 361/679.55 |
| 2015/0138702 | A1 | 5/2015 | Reber et al. | |
| 2016/0122094 | A1 * | 5/2016 | Huang | H04M 1/18 220/262 |
| 2018/0224896 | A1 * | 8/2018 | Shindo | H05K 5/03 |
| 2019/0341719 | A1 * | 11/2019 | Hoshika | H05K 5/03 |
| 2023/0305598 | A1 * | 9/2023 | Kang | C03C 23/0025 361/679.01 |

* cited by examiner

*Primary Examiner* — Anthony Q Edwards
(74) *Attorney, Agent, or Firm* — Cooper Legal Group, LLC (57) ABSTRACT

A mobile electronic device includes a main framework having a motherboard, a back cover covering the main framework and having an expansion window, and an expansion unit is disclosed. The expansion unit includes a door cover covering the expansion window. The door cover includes a back plate and a lateral plate, the lateral plate having an opening. A functional module is disposed on an inner side of the door cover, electrically connected to the motherboard, and has a first side on which an operation interface is disposed. The operation interface faces the opening in the lateral plate.

20 Claims, 13 Drawing Sheets

MOBILE ELECTRONIC DEVICE AND EXPANSION UNIT

CROSS-REFERENCE TO RELATED APPLICATIONS

This application is a continuation-in-part of U.S. patent application Ser. No. 16/890,955, filed on Jun. 2, 2020, and of U.S. patent application Ser. No. 16/995,009, filed on Aug. 17, 2020, the entire disclosures of which are hereby incorporated by reference.

BACKGROUND OF THE INVENTION

Field of the Invention

The present disclosure relates to mobile electronic devices and, more particularly, to a mobile electronic device which optionally comprises an expansion unit insusceptible to a collision and a fall.

Description of the Prior Art

Owing to its limited available space, a conventional mobile electronic device optionally equipped with an expansion unit which is intended to expand some functions but often ends up falling or being hit.

As a result, once the fall or collision happens to the expansion unit, a functional module therein, such as a barcode reader, will retract under an external force generated because of the fall or collision and thus malfunction or get damaged. In view of this, the prior art still has room for improvement.

SUMMARY OF THE INVENTION

It is an objective of the present disclosure to provide a mobile electronic device which optionally comprises an expansion unit in a limited space, and the expansion unit further comprises a stop element which renders the expansion unit insusceptible to a collision and a fall.

In order to achieve the above and other objectives, a first embodiment of the present disclosure provides a mobile electronic device having a main framework including a motherboard, a back cover covering the main framework and having an expansion window, and an expansion unit. The expansion unit includes a door cover covering the expansion window. The door cover includes a back plate and a lateral plate, the lateral plate having an opening. A functional module is disposed on an inner side of the door cover, electrically connected to the motherboard, and has a first side on which an operation interface is disposed. The operation interface faces the opening in the lateral plate.

A second embodiment of the present disclosure provides an expansion unit including a door cover and a functional module. The door cover has a back plate and a lateral plate, the lateral plate having an opening, wherein the door cover is configured to be received in an expansion window of a mobile electronic device. The functional module is disposed on an inner side of the door cover and has a first side on which an operation interface is disposed, wherein the operation interface faces the opening in the lateral plate. The functional module comprises a connector configured to electrically connect the functional module to the mobile electronic device when the door cover is mounted thereon.

The expansion unit and the mobile electronic device of the present disclosure have at least an advantage as follows: the door cover and the functional module together form the expansion unit, the mobile electronic device is capable of selectively expanding use of required functional apparatuses by electrically connecting the motherboard and the expansion unit; the expansion unit makes use of the space inside the framework surface and the space inside one of the sides simultaneously and thereby makes good use of space; the stop apparatus stops the functional module from retracting under an external force to thereby render the mobile electronic device insusceptible to a collision and a fall.

DETAILED DESCRIPTION OF THE EMBODIMENTS

Objectives, features, and advantages of the present disclosure are hereunder illustrated with specific embodiments, depicted with drawings, and described below. However, the accompanying drawings are illustrative, rather than restrictive, of the present disclosure.

Referring to FIG. 1, FIG. 2, FIG. 7 and FIG. 8, the present disclosure provides a mobile electronic device 800 comprising a main framework 1, a back cover 3, a door cover 5, a functional module 6 and a stop element 7. The mobile electronic device 800 further comprises a touch panel 2 as needed. The door cover 5, the functional module 6 and the stop apparatus 7 together form an expansion unit S. Thanks to the expansion unit S, the mobile electronic device 800 is capable of selectively expanding use of required functional apparatuses, such as a barcode reader, a fingerprint detector, a camcorder lens, and an infrared communication apparatus.

The main framework 1 has two opposing framework surfaces 11, 12 and a plurality of sides 13 connected between the two framework surfaces 11, 12. The main framework 1 has therein a motherboard (not shown). The touch panel 2 is disposed on and fixed to the framework surface 11. In a variant embodiment not illustrated by any diagram, a display screen or any other electronic device is fixed to the framework surface 11. Therefore, the framework surfaces 11, 12 are illustrative, rather than restrictive, of the present disclosure.

Figure 1:
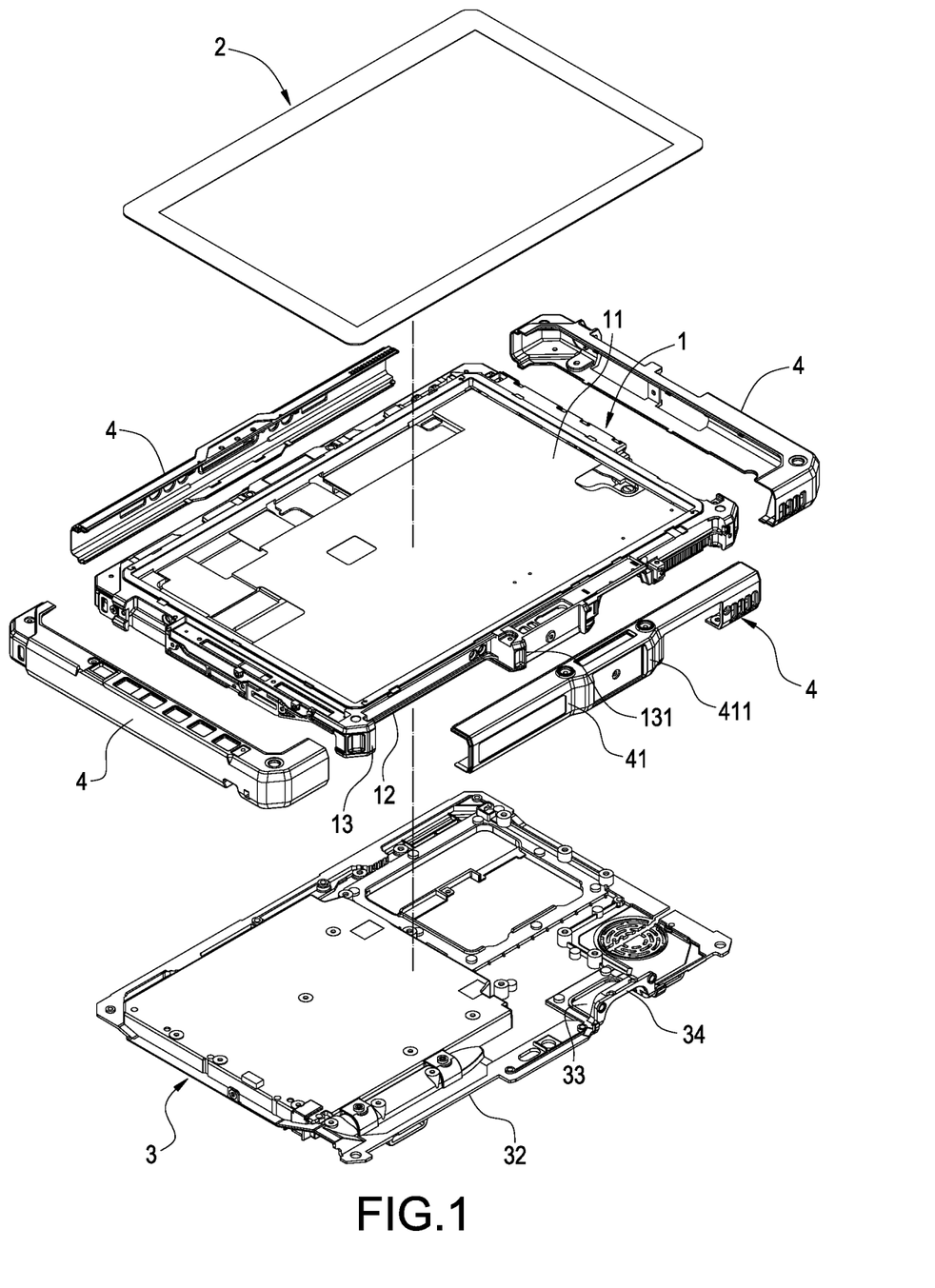
FIG. 1 is an exploded view of a mobile electronic device according to the present disclosure (without showing an expansion unit).
Figure 7:
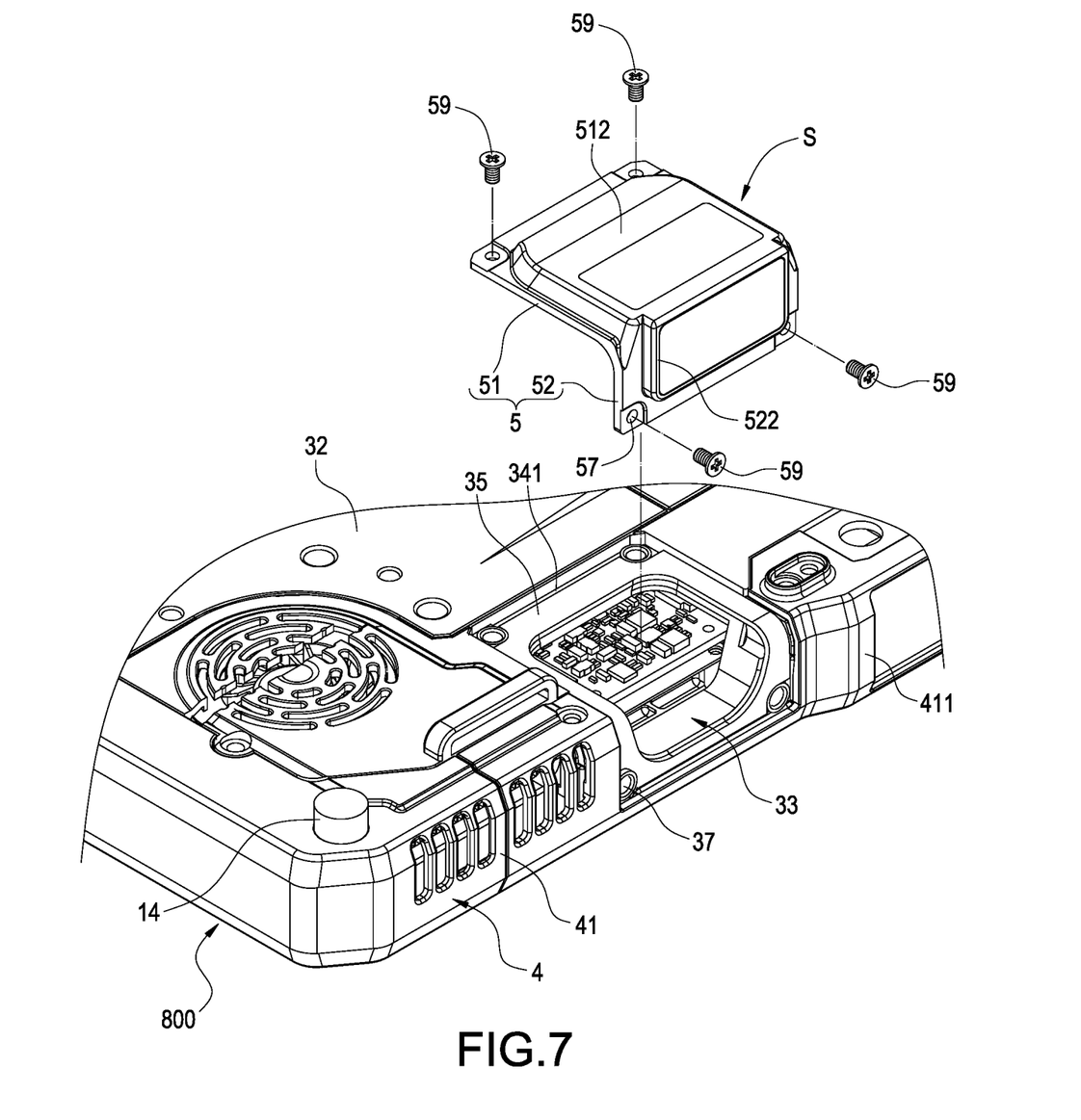
FIG. 7 is a perspective view of the mobile electronic device before the expansion unit is fitted to according to the present disclosure.

The back cover 3 is disposed on and fixed to the framework surface 12, such that the back cover 3 covers the main framework 1. The back cover 3 has an expansion window 33 and has an exposed outer cover surface 32. The expansion window 33 is in communication with the main framework 1 and thus with the motherboard. The expansion window 33 can be located at any point of the back cover 3 and preferably corresponds in position to the framework surface 12 and one of the sides 13 of the main framework 1 (as shown in FIG. 1 and FIG. 7). Therefore, the expansion unit S makes use of the space inside the framework surface 12 and the space inside one of the sides 13 simultaneously and thereby makes good use of space.

The door cover 5 corresponds in position to the expansion window 33 and is fixed to the outer cover surface 32 of the back cover 3; consequently, the door cover 5 covers and closes the expansion window 33. The door cover 5 has an inner side (not denoted by any reference numeral) and an outer side (not denoted by any reference numeral) opposing the inner side.

Figure 6:
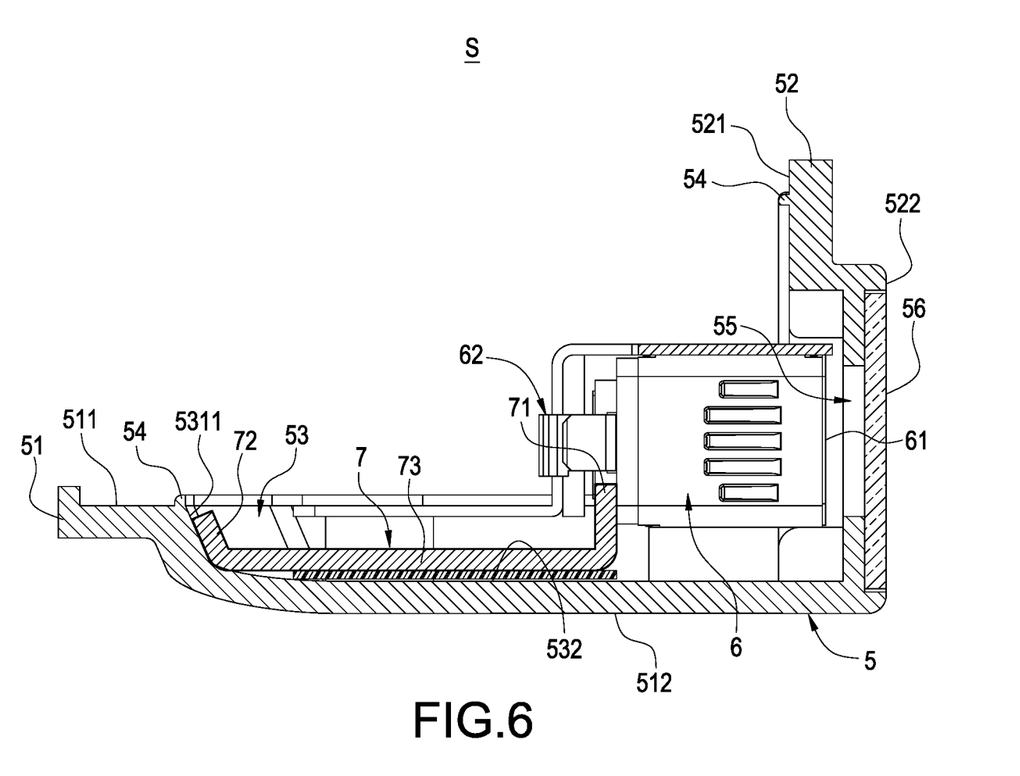
FIG. 6 is a sectional view of the expansion unit according to the present disclosure.

The functional module 6 is disposed on the inner side of the door cover 5. The functional module 6 is electrically connected to a motherboard of the mobile electronic device 800 via the expansion window 33. In embodiments of the application, the electrical connection between the functional module 6 and the motherboard is achieved by, for example, a connector 62 provided on functional module 6 and one or more flexible printed circuits (FPC, not shown) or a plurality of flexible flat cables (FFC, not shown) connected between the connector 62 and the motherboard, but the present disclosure is not limited thereto. Referring to FIG. 6, an operation interface 61 is disposed on an outward side of the functional module 6 and corresponds in position to the outer side of the door cover 5 (actually corresponds in position to a lateral plate outer side 522 shown in FIG. 6 and described later).

In embodiments of the application, the functional module 6 is a barcode reader, a fingerprint detector, a camera, or an infrared communication apparatus. In other embodiments, the functional module 6 a USB Type-C, a USB, an SD card, a LAN, a VGA, and a serial port.

After the door cover 5 has been fixed to the back cover 3, the outer side of the door cover 5 is directly exposed from the entire mobile electronic device 800; consequently, the functional module 6 is likely to retract toward the interior of the mobile electronic device under an external force (generated, for example, as a result of a collision or a fall which happens to the mobile electronic device in its entirety).

To stop the external force, the stop apparatus 7 is disposed on the inner side of the door cover 5 and in embodiments of the application covers the functional module 6. In detail, the stop apparatus 7 abuts against an inward side (opposite the aforesaid outward side) of the functional module 6. The stop apparatus 7 exposes the connector 62 of the functional module 6. The door cover 5, the functional module 6 and the stop apparatus 7 together form the expansion unit S.

Figure 4:
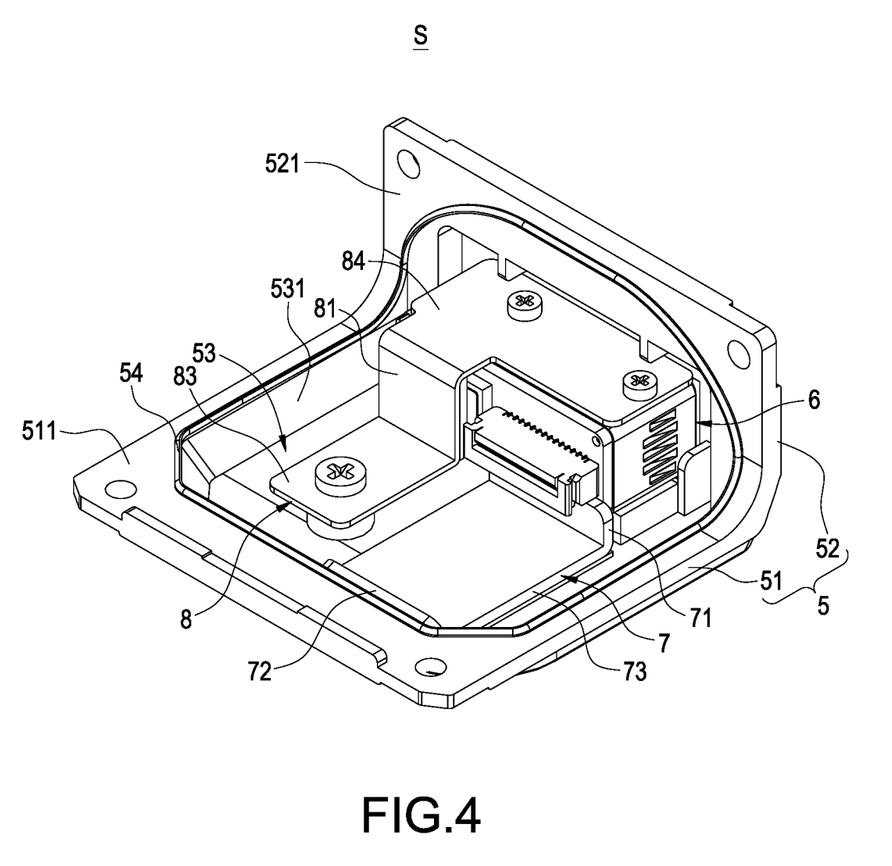
FIG. 4 is a perspective view based on FIG. 3 according to the present disclosure.

Referring to FIG. 4, even if the expansion unit S is subjected to an external force, the stop apparatus 7 will counter the external force and thus stop the retraction of the functional module 6 relative to the door cover 5, thereby preventing the functional module 6 from malfunctioning or getting damaged. In some embodiments of the application, the stop apparatus 7 is made of metal material with high structure strength to further counter the external force. In other embodiments of the application, the door cover 5 is made of metal material to further protect the functional module 6 and other electronic components.

Figure 2:
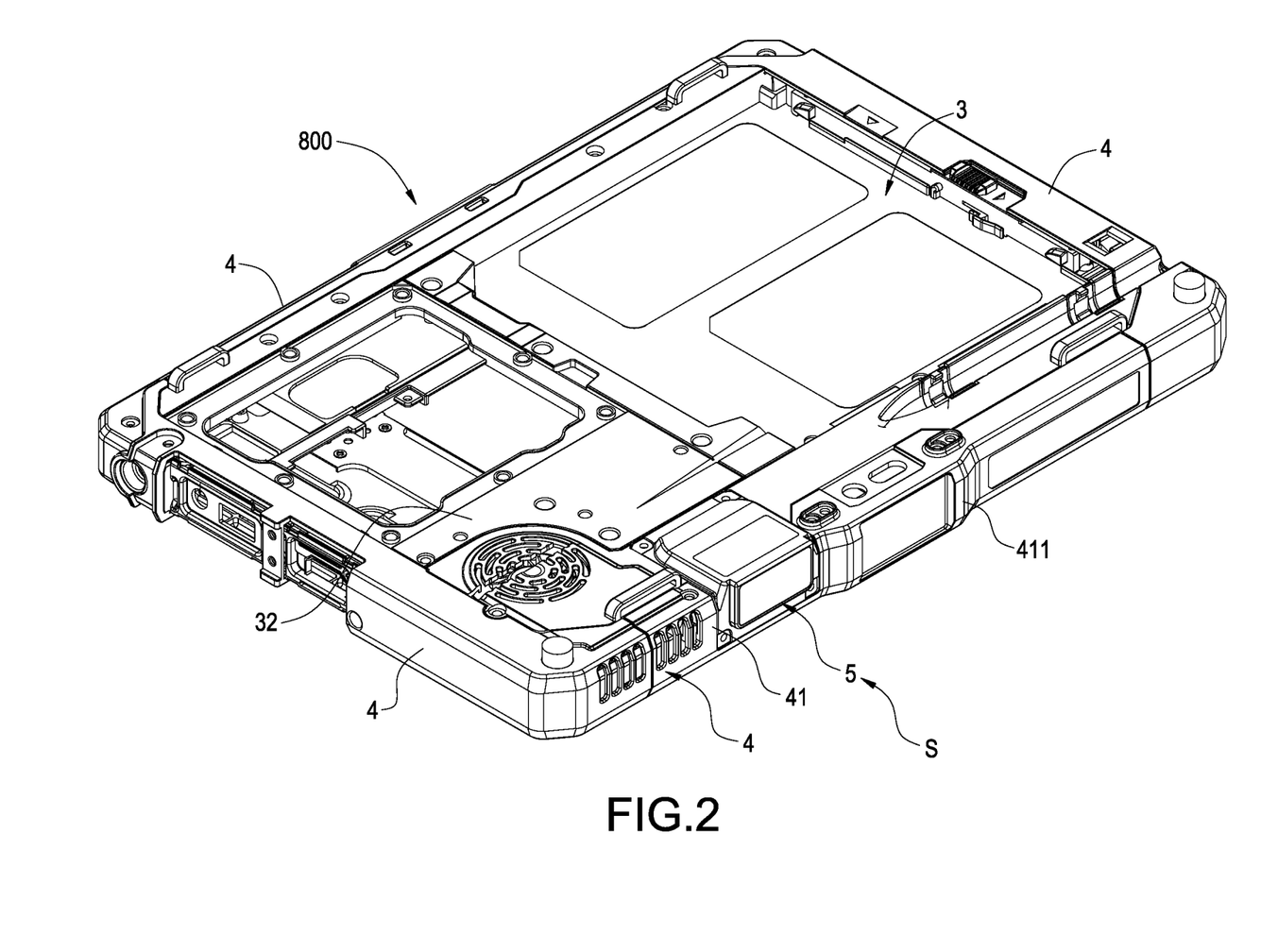
FIG. 2 is a perspective view of the mobile electronic device from another angle according to the present disclosure.

The present disclosure is not restrictive of the structure of the door cover 5. In this embodiment, the door cover 5 is illustrated by FIG. 3 through FIG. 6. The door cover 5 essentially comprises a back plate 51 and preferably further comprises a lateral plate 52 bent and connected to the back plate 51, such that the door cover 5 corresponds in shape to the framework surface 12 and one of the sides 13 (as shown in FIG. 1, FIG. 2 and FIG. 7). The aforesaid inner side of the door cover 5 includes a back plate inner side 511 of the back plate 51 and a lateral plate inner side 521 of the lateral plate 52, whereas the aforesaid outer side of the door cover 5 includes a back plate outer side 512 of the back plate 51 and a lateral plate outer side 522 of the lateral plate 52.

As shown in FIG. 7, in embodiments of the application, the expansion unit S may be connected to the mobile electronic device 800 with one or more fixing elements 59 threaded through holes 57 in the door 5 and holes 37 in the back cover 3 and received in corresponding openings in the expansion window 33.

Figure 8:
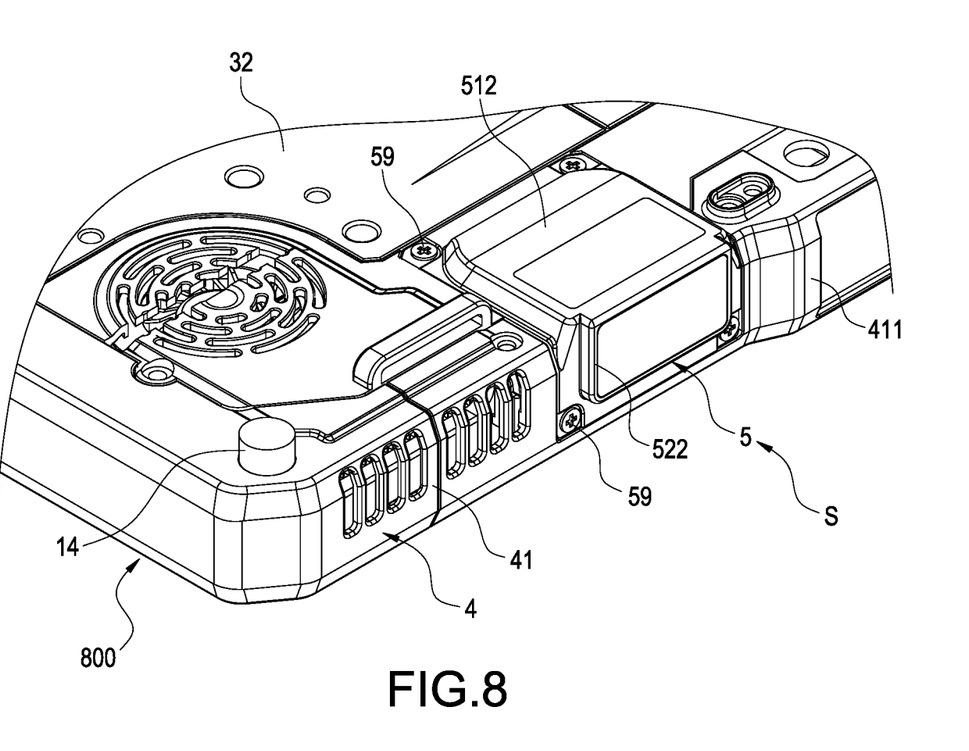
FIG. 8 is a perspective view of the mobile electronic device after the expansion unit has been fitted to according to the present disclosure.
Figure 9:
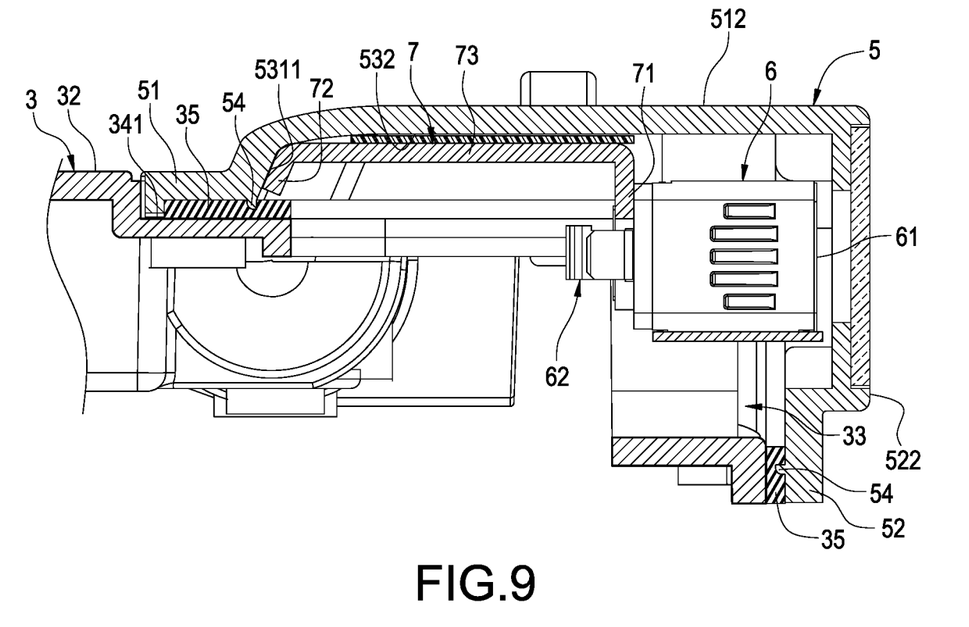
FIG. 9 is a partial sectional view based on FIG. 8 according to the present disclosure.

Referring to FIG. 7 and FIG. 8, to augment the insusceptibility of the expansion unit S (and especially the functional module 6) to a collision and a fall, a plurality of protruding members 14 are protrudingly disposed at the periphery of the framework surface 12 of the main framework 1. For instance, a protruding member 14 is protrudingly disposed at each of the four corners of the framework surface 12, and all the protruding members 14 are higher than the back plate outer side 512. Thus, even if the external force is exerted toward the back plate outer side 512, the impact of the external force will be on the protruding members 14 rather than the back plate outer side 512, thereby enhancing the insusceptibility of the back plate outer side 512 to a collision and a fall. In a variant embodiment, the protruding members 14 are disposed on the outer cover surface 32 (not shown) of the back cover 3.

Referring to FIG. 1, FIG. 2, FIG. 7 and FIG. 8, at least one protruding portion 131 is protrudingly disposed on one of the sides 13 of the main framework 1, and the protruding portion 131 is higher than the lateral plate outer side 522. Thus, even if the external force is exerted toward the lateral plate outer side 522, the impact of the external force will be on the protruding portion 131 rather than the lateral plate outer side 522, thereby enhancing the insusceptibility of the lateral plate outer side 522 to a collision and a fall. Referring to FIG. 1, in a variant embodiment, a protruding portion 411 is disposed on a side 41 of a fitting element 4 to enhance the insusceptibility to a collision and a fall. In other words, after the main framework 1, the touch panel 2 and the back cover 3 have been stacked up, one said fitting element 4 is fitted to each of the sides 13, and the protruding portion 411 is protrudingly disposed on the side 41 of one of the fitting elements 4. The aforesaid two types of arrangement can be separately implemented. In this embodiment, the aforesaid two types of arrangement are concurrently implemented as follows: the fitting element 4 with the protruding portion 411 is fitted to one of the sides 13 with the protruding portion 131.

Referring to FIG. 3 through FIG. 6, the stop apparatus comprises a first stop element 7 and a second stop element 8. To augment the stopping strength and stopping stability of the stop element 7, a stopping member 5311 is disposed on the inner side of the door cover 5, such that two opposing ends of the first stop element 7 abut against the stopping member 5311 and the inward side of the functional module 6, respectively.

The present disclosure is not restrictive of the structure of the stopping member 5311. In this embodiment, a recess 53 is disposed on the inner side of the door cover 5, such that a recess wall 531 is disposed at the periphery of the inner side of the door cover 5 and corresponds in position to the recess 53, and a portion of the recess wall 531 (facing the inward side) functions as the stopping member 5311, thereby optimizing the stopping strength and stopping stability.

To enable the first stop element 7 to perform its stopping function within the recess 53, the first stop element 7 comprises a first abutting portion 71, a second abutting portion 72, and a connecting portion 73 connected between the first abutting portion 71 and the second abutting portion 72. The first abutting portion 71 and the second abutting portion 72 bend relative to two opposing ends of the connecting portion 73, respectively. The first abutting portion 71 is in contact with the aforesaid inward sides, because both its shape and bend angle match the aforesaid inward sides. The second abutting portion 72 is in contact with the stopping member 5311, because both its shape and bend angle match the stopping member 5311. A surface of the connecting portion 73 is in direct or indirect contact with a recess bottom surface 532 of the recess 53 and thereby generates an enhanced supportive force.

The recess 53 is collectively disposed on the back plate inner side 511 and lateral plate inner side 521. The back plate outer side 512 and lateral plate outer side 522 bulge relatively. Consequently, owing to the recess 53, both the functional module 6 and the first stop element 7 gain extra available space to alleviate the inadequacy of space available to the mobile electronic device.

In some embodiments, the stop apparatus comprises a second stop element 8 is disposed on the inner side of the door cover 5 and abutting against the inward side of the functional module 6. The second stop element 8 comprises a first abutting portion 81 and a connecting portion 83, the first abutting portion 81 abutting against the second side of the functional module 6 and the connecting portion 83 abutting against the back plate 53. In embodiments of the application, the first abutting portion 81 further includes an extension portion 84 abutting against a top of the functional module facing away from the back plate 53. Moreover, fixing elements 91 and 92 are threaded through openings 841 and 831, respectively, to fix the stop element 8 to the functional module 6 and door cover 5.

Figure 4A:
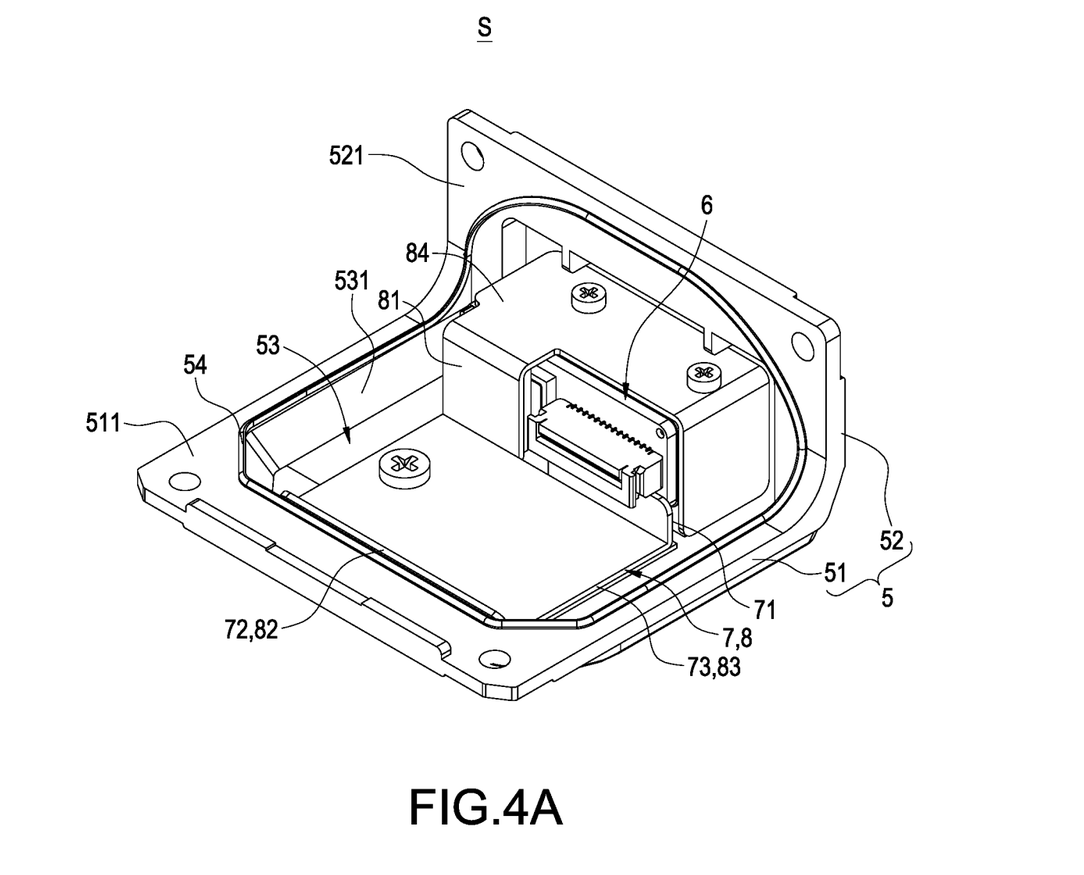
FIG. 4A is a perspective view of another expansion unit according to the present disclosure.

In other embodiments of the application illustrated in FIG. 4A, the first stop element 7 and the second stop element 8 are integrally formed. The stop apparatus 7 is disposed on the inner side of the door cover 5 and covers the functional module 6. In detail, the stop apparatus 7 abuts against an inward side (opposite the aforesaid outward side) of the functional module 6. The stop apparatus 7 exposes the connector 62 of the functional module 6.

In still other embodiments, the second stop element 8 includes a second abutting portion 82, the first abutting portion 81 and the second abutting portion 82 located at two opposing ends of the connecting portion 83, respectively.

Referring to FIG. 4 through FIG. 9, to prevent water from seeping into the functional module 6, it is necessary to provide a waterproofing structure (not denoted by any reference numeral) between the door cover 5 and the back cover 3. The waterproofing structure comprises: a rib 54 disposed on the inner side of the door cover 5; and a resilient portion 35 disposed on an outer connecting surface 341 of the back cover 3. The resilient portion 35 can not only be directly disposed on the outer connecting surface 341 but also be equipped with a resilient pad or a waterproof foam as shown in the diagrams, but the present disclosure is not limited thereto. The outer connecting surface 341 surrounds the expansion window 33. When the door cover 5 covers the expansion window 33, the resilient portion 35 is pressed by the rib 54 and thus resiliently sags to become watertight, thereby effecting waterproofness.

The present disclosure is not restrictive of the position of the waterproofing structure. In this embodiment, the rib 54 is protrudingly disposed on the back plate inner side 511 and lateral plate inner side 521 and surrounds the recess 53. The back cover 3 has a surrounding portion 34 (shown in FIG. 1) which surrounds the expansion window 33 and corresponds in position to the rib 54. The outer connecting surface 341 is defined on the outer side (exposed side) of the surrounding portion 34. The surrounding portion 34 bends relative to the framework surface 12 and one of the sides 13, such that the surrounding portion 34 corresponds in shape to the framework surface 12 and one of the sides 13 (shown in FIG. 1, FIG. 2 and FIG. 7).

The door cover 5 corresponds in position to the expansion window 33 and is fixed to the back cover 3, such that the outer connecting surface 341 of the surrounding portion 34 is connected to the inner sides (inclusive of 511 and 521) of the door cover 5; consequently, the resilient portion 35 is pressed by the rib 54 and thus resiliently sags to become watertight, thereby effecting waterproofness.

Figure 10:
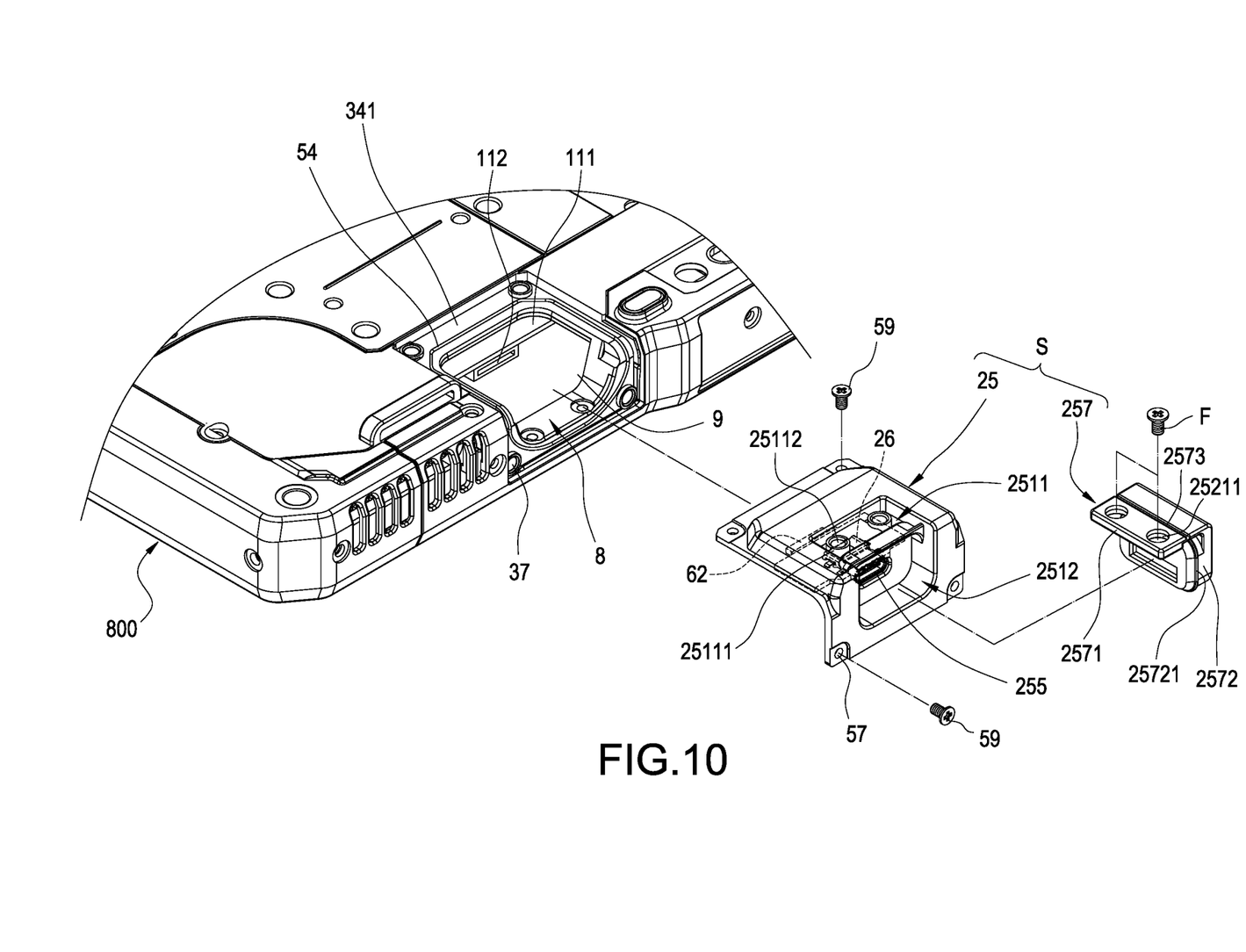
FIG. 10 is an exploded three-dimensional diagram of an electronic device according to the other embodiment of the present disclosure.
Figure 11:
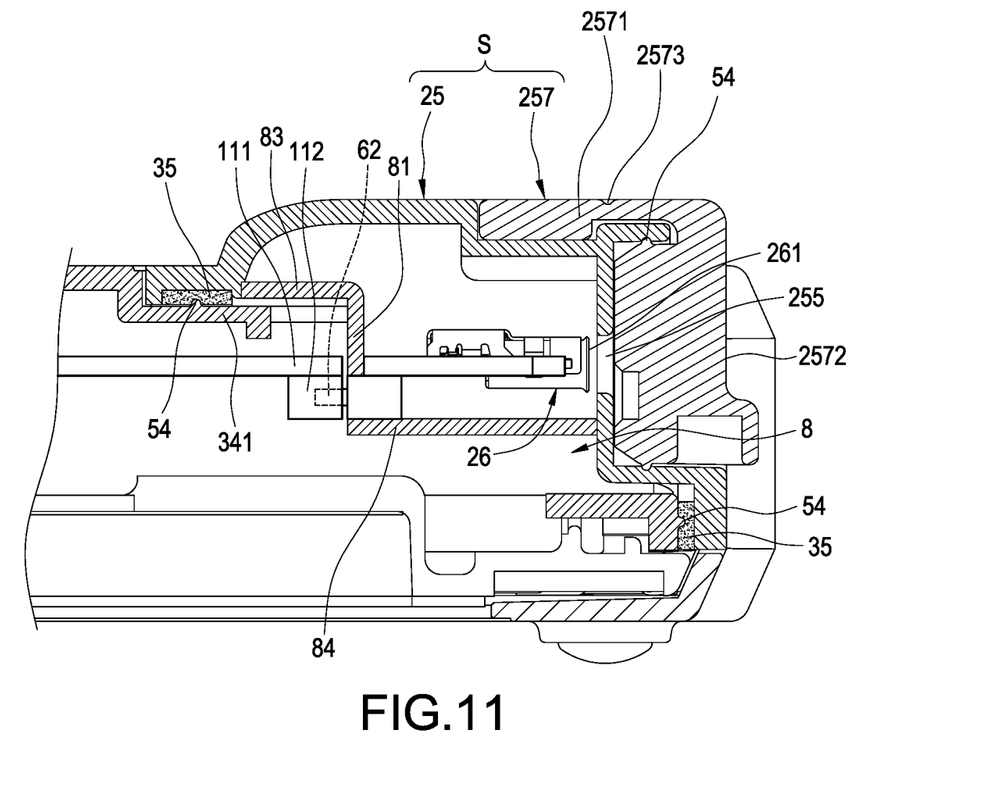
FIG. 11 is a partial sectional view based on FIG. 10 according to the present disclosure.

In a variant embodiment, an example of which is illustrated in FIGS. 10-11, the rib 54 is disposed on the outer connecting surface 341, and the resilient portion 35 is disposed on the door cover 25, thereby effecting waterproofness.

Figure 3:
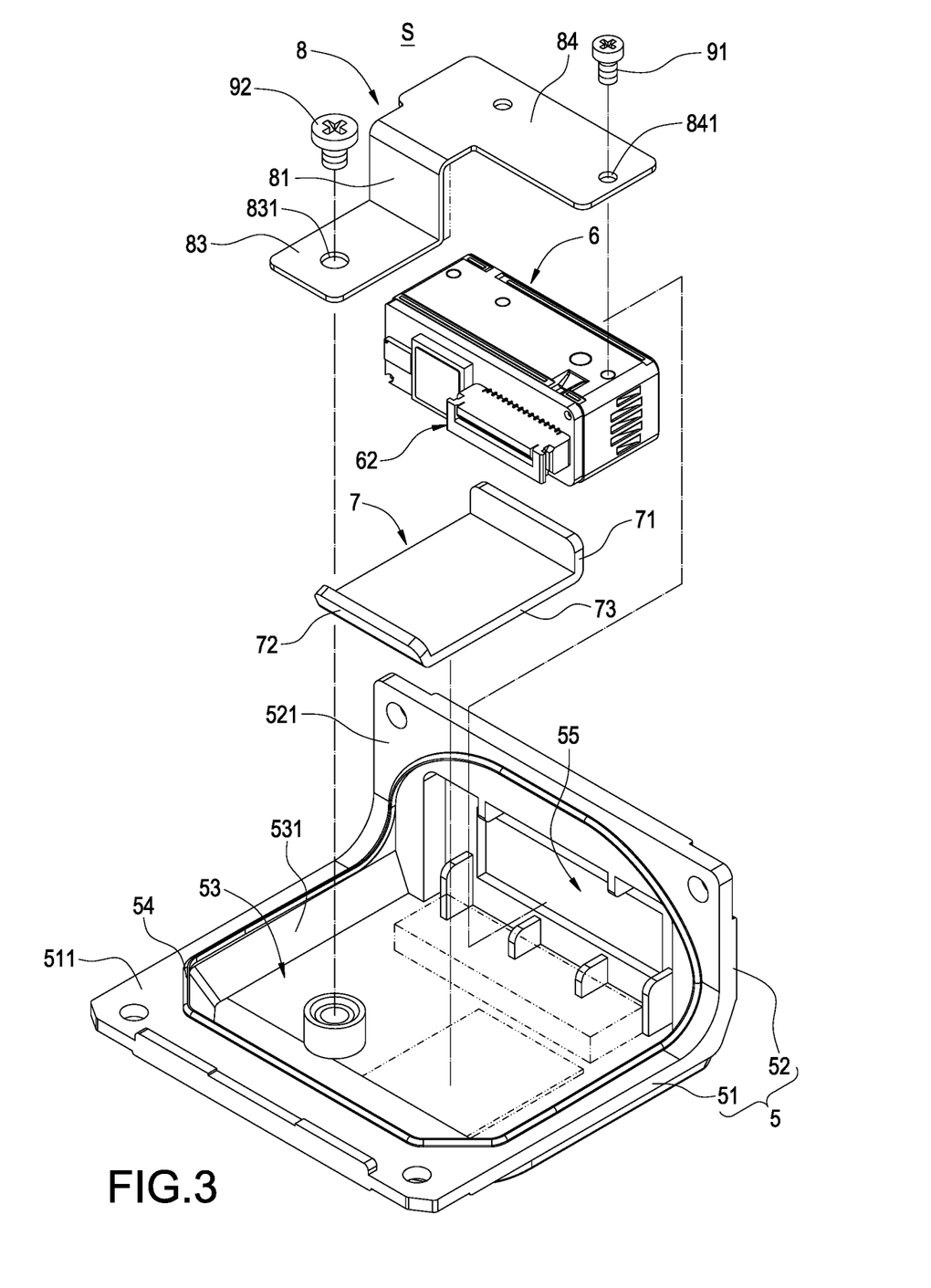
FIG. 3 is an exploded view of an expansion unit according to the present disclosure.
Figure 5:
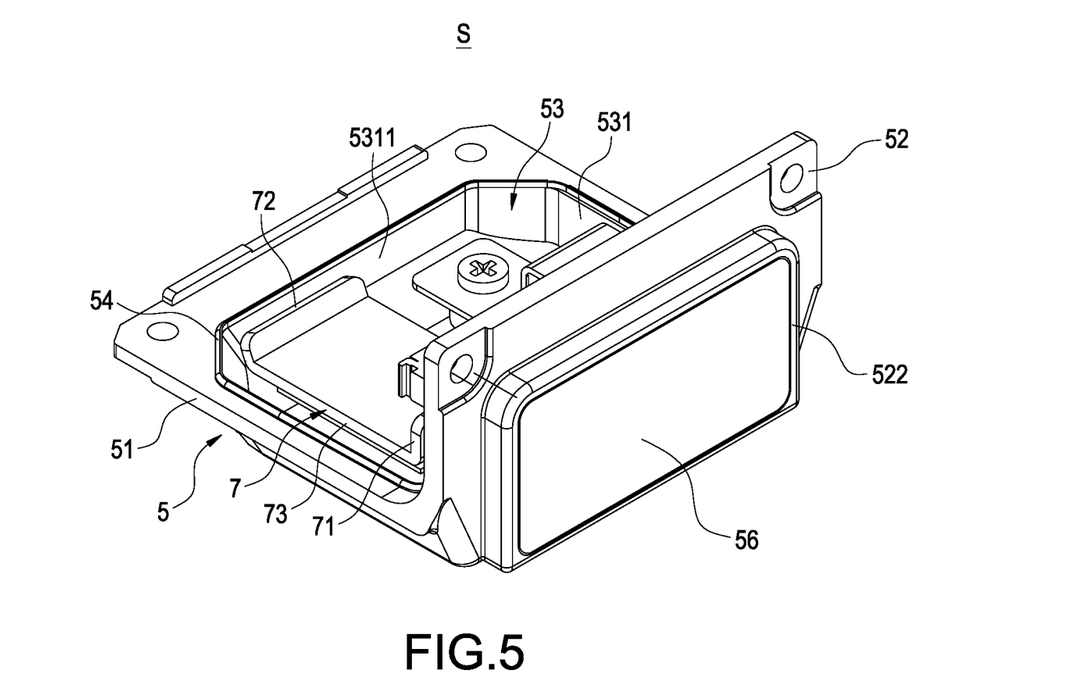
FIG. 5 is a perspective view based on FIG. 3 from another angle according to the present disclosure.

In embodiments of the application illustrated in FIGS. 3 and 6, the lateral plate 52 of the door cover 5 defines an opening 55 corresponding to operation interface 61. In some embodiments, a transparent panel 56 may be arranged to cover the opening 55, as shown in FIGS. 5 and 6. However, it is understood that the panel need not be transparent according to the nature and needs of the operation interface.

Figure 11A:
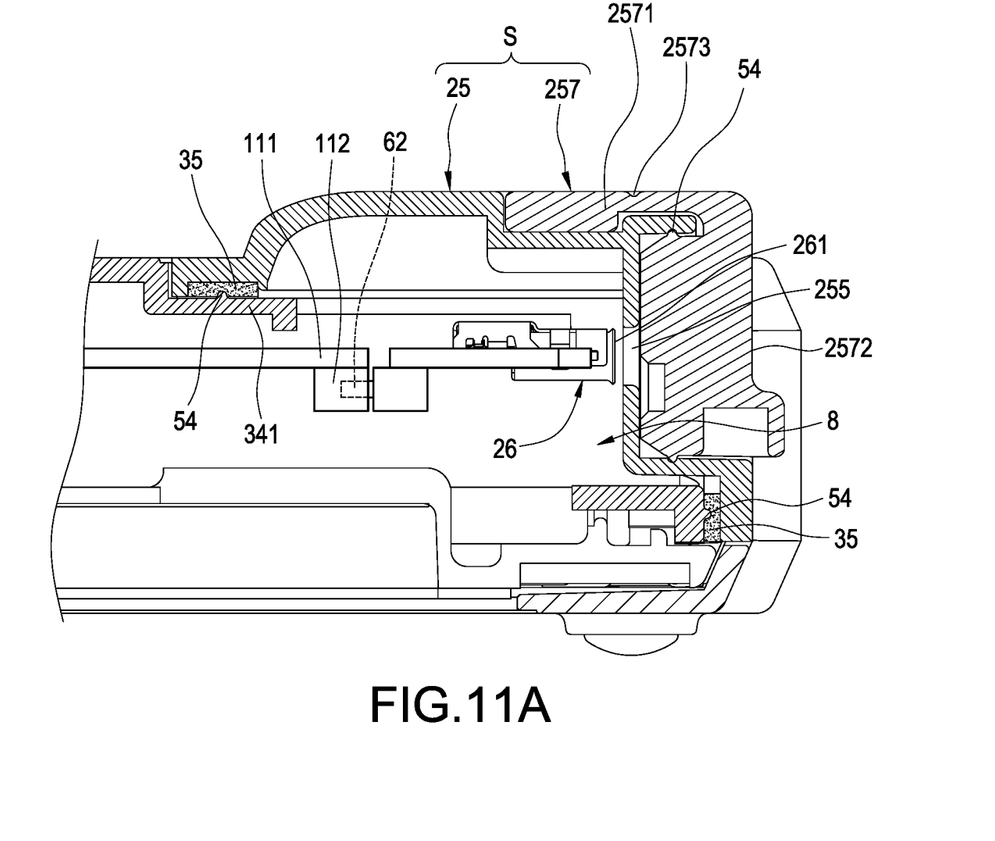
FIG. 11A is a partial sectional view of another embodiment according to the present disclosure.

In other embodiments of the application illustrated in FIGS. 10-11, an opening 255 functions as an insertion slot and exposes the operation interface 261. For example, where the functional module 26 is a port, the opening 255 allows a user to connect an external device to the mobile electronic device 800 via the port provided in the expansion unit S. In preferred embodiments, the functional module 26 is electrically connected to a motherboard 111 of the mobile electronic device 800 by a connector 62 of functional module 26 and a connector 112 of the motherboard 111. A lid 257 is connected in a liftable and covering manner to the door cover 25, so as to expose the opening 255 when lifted open or to block the opening 255 when closed for covering. In an alternate embodiment of the application illustrated in FIG. 11A, the expansion unit S does not have a stop apparatus or an abutting structure.

In embodiments of the application, the lid 257 has a shape corresponding to that of the door cover 25, and is also formed as an L-shaped bend (as shown in FIG. 10 and FIG. 11). In some embodiments, the lid 257 includes a fixing plate 2571, a movable plate 2572, and a bending portion 2573 connected between the fixed plate 2571 and the movable plate 2572. The door cover 25 further includes a first recess 2511 and a second recess 2512 adjacent to each other. The first recess 2511 and the second recess 2512 are both recessed from the opening 8 toward the interior of the mobile electronic device 800. The first recess 2511 is provided therein with a plurality of (at least two) in-recess fixing columns 25111, each of the in-recess fixing columns 25111 is provided with a fifth fixing hole 25112, and the second recess 2512 is provided therein with the foregoing opening 255.

In embodiments of the application, the fixing plate 2571 is provided with a plurality of sixth fixing holes 25211. By correspondingly embedding the fixing plate 2571 in the first recess 2511, the fifth fixing holes 25112 and the sixth fixing holes 25211 may be respectively corresponded to each other, thus facilitating the plurality of fixing elements F to be respectively detachably fixed between the fifth fixing holes 25112 and the sixth fixing holes 25211, enabling the fixing plate 2571 to be detachably fixed in the first recess 2511 of the door cover 25. It should be noted that, even if the door cover 25 has a small thickness, the fixing elements F can be provided with a longer fixing length using the in-recess fixing columns 25111, further providing a stable coupling effect.

In embodiments of the application, a peripheral rib 25721 projects from an outer periphery of the movable plate 2572. When the movable plate 2572 is correspondingly embedded in the second recess 2512, the peripheral rib 25721 can be abutted against an inner periphery of the second recess 2512, hence producing waterproof and dustproof effects for the insertion slot 255 between the movable plate 2572 and the second recess 2512.

In embodiments of the application, the outer connecting surface 341 projects from the inner periphery of the mobile electronic device 800 corresponding to the opening 8, and surrounds correspondingly to the opening 8. Hence, when the door cover 25 covers the opening 8, the door cover 25 is blocked by the outer connecting surface 341. At this point, even if the expansion unit S receives the impact of an external force, the door cover 25 is prevented from being withdrawn inward toward the mobile electronic device 800 by the blocking of the outer connecting surface 341, thereby further avoiding issues of collision and damage of the functional module 6 caused by inappropriate inward withdrawal of the door cover 25.

In conclusion, the mobile electronic device of the present disclosure achieves the aforesaid objective of the present disclosure and overcomes the aforesaid drawbacks of the prior art.

The present disclosure is disclosed above by preferred embodiments. However, persons skilled in the art should understand that the preferred embodiments are illustrative of the present disclosure only, but shall not be interpreted as restrictive of the scope of the present disclosure. Hence, all equivalent structural changes made to the aforesaid embodiments shall fall within the scope of the present disclosure. Accordingly, the legal protection for the present disclosure shall be defined by the appended claims.

What is claimed is:

1. A mobile electronic device, comprising:
   a main framework having a motherboard;
   a back cover covering the main framework and having an expansion window; and
   an expansion unit, comprising:
   a door cover covering the expansion window, the door cover comprising a back plate and a lateral plate, the lateral plate comprising an opening; and
   a functional module disposed on an inner side of the door cover, electrically connected to the motherboard, and having a first side on which an operation interface is disposed, the operation interface facing the opening in the lateral plate such that the operation interface is visible through the opening.

2. The mobile electronic device of claim 1, wherein the functional module is a universal serial bus (USB) Type-C, a USB, a secure digital (SD) card, a local area network (LAN), a video graphics array (VGA), or a serial port.

3. The mobile electronic device of claim 1, further comprising a lid connected in a liftable and covering manner to the door cover, arranged to expose the opening when lifted open and to block the opening when closed.

4. The mobile electronic device of claim 3, wherein the lid comprises a fixing plate, a movable plate, and a bending portion connected between the fixing plate and the movable plate.

5. The mobile electronic device of claim 4, wherein the door cover further comprises a first recess and a second recess adjacent to each other, wherein the first recess and the second recess are each recessed from the opening toward an interior of the mobile electronic device.

6. The mobile electronic device of claim 5, wherein the first recess is provided therein with a plurality of in-recess fixing columns, each of the in-recess fixing columns is provided with a fifth fixing hole, and the second recess is provided therein with the opening.

7. The mobile electronic device of claim 6, wherein the fixing plate is provided with a plurality of sixth fixing holes, arranged such that when the fixing plate is disposed in the first recess, the fifth fixing holes and the sixth fixing holes respectively correspond to each other.

8. The mobile electronic device of claim 7, further comprising a plurality of fixing elements respectively detachably fixed between the fifth fixing holes and the sixth fixing holes.

9. The mobile electronic device of claim 1, wherein a stop apparatus is disposed on the inner side of the door cover and covers the functional module.

10. The mobile electronic device of claim 9, wherein the stop apparatus exposes a connector of the functional module.

11. The mobile electronic device of claim 10, wherein the stop apparatus is fixed on at least one of the back plate or the lateral plate.

12. The mobile electronic device of claim 11, wherein the stop apparatus fixes the functional module on the back plate and abuts against a second side of the functional module, and the second side facing away from the operation interface.

13. The mobile electronic device of claim 12, wherein the stop apparatus comprises a first stop element and a second stop element, the first stop element fixes the functional module on the back plate, and the second stop element abuts against the second side of the functional module.

14. The mobile electronic device of claim 9, wherein the stop apparatus is made of metal material.

15. The mobile electronic device of claim 9, wherein the door cover is made of metal material.

16. An expansion unit, comprising:
   a door cover comprising a back plate and a lateral plate, the lateral plate comprising an opening, the door cover configured to be received in an expansion window of a mobile electronic device; and
   a functional module disposed on an inner side of the door cover, and having a first side on which an operation interface is disposed, the operation interface facing the opening in the lateral plate such that the operation interface is visible through the opening;

wherein the functional module comprises a connector configured to electrically connect the functional module to the mobile electronic device when the door cover is mounted on the mobile electronic device.

17. The expansion unit of claim 16, further comprising a lid connected in a liftable and covering manner to the door cover, arranged to expose the opening when lifted open and to block the opening when closed.

18. The expansion unit of claim 17, wherein the functional module is a universal serial bus (USB) Type-C, a USB, a secure digital (SM) card, a local area network (LAN), a video graphics array (VGA), or a serial port.

19. The expansion unit of claim 16, further comprising a transparent panel covering the opening.

20. The expansion unit of claim 19, wherein the functional module is a barcode reader, a fingerprint detector, a camera, or an infrared communication apparatus.

* * * * *